J. C. HALL.
Harvester Rake.

No. 81,628.

Patented Sept. 1, 1868.

Witnesses.
Edwin E. Bowdoin
James B.

Inventor
John C. Hall

UNITED STATES PATENT OFFICE.

JOHN C. HALL, OF MONROE, WISCONSIN.

IMPROVEMENT IN HARVESTER-RAKES.

Specification forming part of Letters Patent No. 81,628, dated September 1, 1868.

*To all whom it may concern:*

Be it known that I, JOHN C. HALL, of Monroe, in the county of Green and State of Wisconsin, have invented a new and useful Improvement in Harvester-Rakes; and I do hereby declare that the following is a full, clear, and exact description thereof, which will enable others skilled in the art to make and use the same, reference being had to the accompanying drawings, forming part of this specification, in which—

Figure 1:
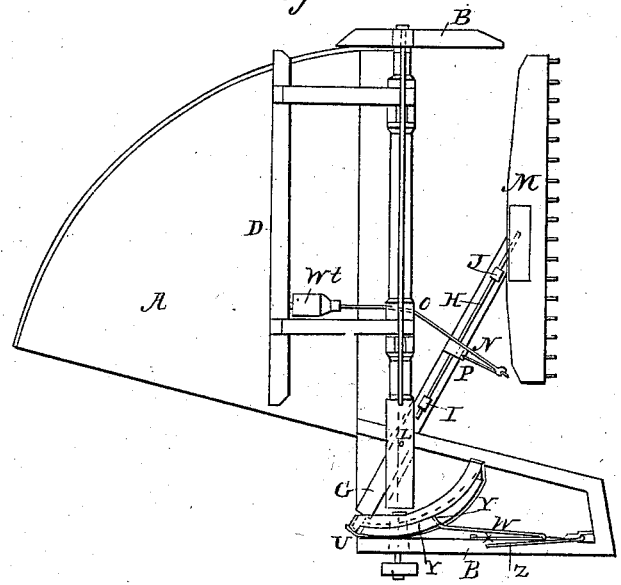
Figure 2:
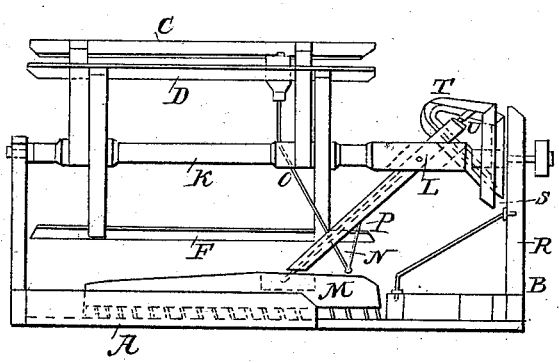
Figure 3:
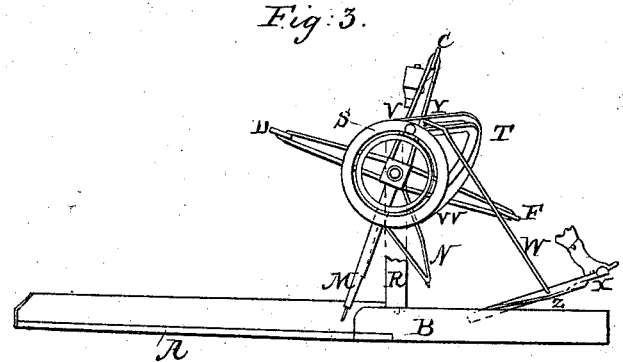

Figure 1 is a top view of my improved harvester-rake. Fig. 2 is a rear or back view of the same. Fig. 3 is an end view.

Similar letters of reference indicate like parts.

My invention belongs to that class of harvester-rakes wherein one of the slats of the reel is made to serve the double purpose of a beater and a rake.

A is the platform upon which the grain falls when cut. B is the frame to which the platform is attached, and by which the reel and rake are supported. C, D, and F are slats or beaters of the reel, constructed in the ordinary manner.

The rake-staff consists of two parts, G and H, as shown in the drawings; that is to say, the lower part H is recessed upon the other part G, and so secured to it by the journal-boxes or bearings I and J as to permit of one part being rotated upon the other; or one part may be hinged to the other in any equivalent or suitable manner, to permit rotation.

At a point about one foot, more or less, from its upper end, the rake-staff is somewhat loosely but securely pivoted to the reel-shaft K at L; that is to say, in such a manner as to permit the staff to swing out to nearly a right angle with the shaft, and also to swing back to such position in the reel as will place the rake-head in its proper relation as a beater. M is the rake-head, or rake proper, securely fixed to the lower end of the rotating portion of the staff. N is a jointed arm, firmly secured at one end to the reel-shaft at O, and at its opposite end to the rotating part of the rake-staff at P; that is to say, this jointed arm is made of such length, and placed in such relation with and attached at such points of the staff and reel-shaft, that when the rake-head is in its proper position in the reel to perform its office of a beater, the lower part of the arm will be folded upon the other at an acute angle, in the manner of the fore-arm upon the arm of a person; and, also, this arm is so constructed and placed that, when the reel is in motion, and the rake-head has reached the sickle-bar, the extension or unfolding of this arm will swing the rake-staff outward from the reel-shaft K, thus compelling the rake-head to sweep over the platform in a curved direction. This jointed arm also serves the important purpose of preventing the lower part of the rake-staff being rotated upon its axis by the reel-shaft during the raking movement, and thus compelling the rake M to present a perpendicular face to the grain on the platform throughout this operation.

As a guide to the rake, and to enable the driver to control its movements, I fix a cam to the standard R, supporting the outer end of the reel, and so placed that the reel-shaft passes through it at or near its center. This cam consists of two parts. One of these parts S is circular; the other part T is eccentric. The eccentric groove or recess in this cam opens out from the upper side of the circular groove and enters it at the opposite side. Running in these grooves is a friction-pulley, U, attached to the upper or outer end of the rake-staff. When this pulley is running in the circular groove the rake is kept in the reel as a beater, and when it is directed into the eccentric the rake is forced across the platform, as heretofore described, the jointed arm acting in conjunction with the eccentric to produce this movement. The eccentric also serves the purpose of folding the rake back into the reel after the raking operation is completed. The hinged valve V, placed at the upper junction of the eccentric and circular grooves, serves the purpose of directing the end of the rake-staff into either of the grooves, as desired.

This valve is placed under the control of the driver by means of the rod W, connecting the treadle X with a pin, Y, fixed in the valve. The spring Z keeps the valve in the proper place to force the pulley into the eccentric, and thus rake off the grain at every revolution of the reel; but by pressure of the driver's foot at Z, the valve is turned so as to direct the pulley into the circular groove. Thus, the driver is able to make the gavels of nearly uniform size in different kinds of grain. The valve or switch V V keeps the roller in the circular groove when backing.

The cam S and T has a general concave form, the walls or sides of its grooves being at all points perpendicular to a concave surface, the focal point of which is the pivoted junction of the rake-staff and reel-shaft. It is a weight to counterbalance the rake.

What I claim as new, and desire to secure by Letters Patent, is—

1. The rake-staff constructed in two parts, G and H, carrying the rake M, and pivoted directly to the reel-shaft K, substantially in the manner and for the purposes set forth.

2. The jointed arm N, when its outer end is rigidly fixed to the rake-staff H, for the purpose set forth.

JOHN C. HALL.

Witnesses:
DANIEL TITUS,
JAMES P. PRESTON.